H. R. WILLIAMS.
ADJUSTABLE SHAFT HANGER FOR MOTOR VEHICLES.
APPLICATION FILED MAR. 12, 1917. RENEWED OCT. 22, 1919.
1,342,143.
Patented June 1, 1920.
2 SHEETS—SHEET 1.
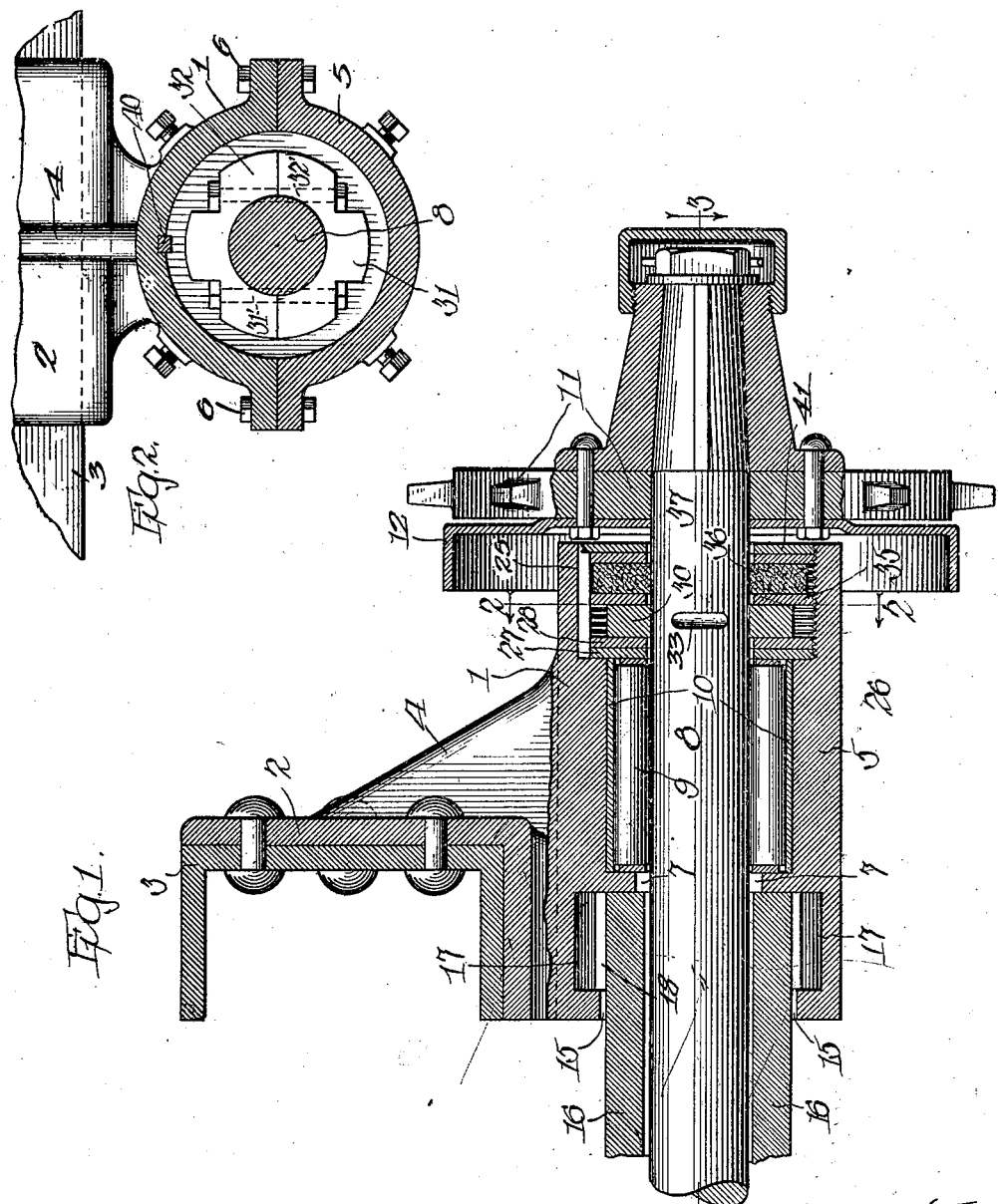

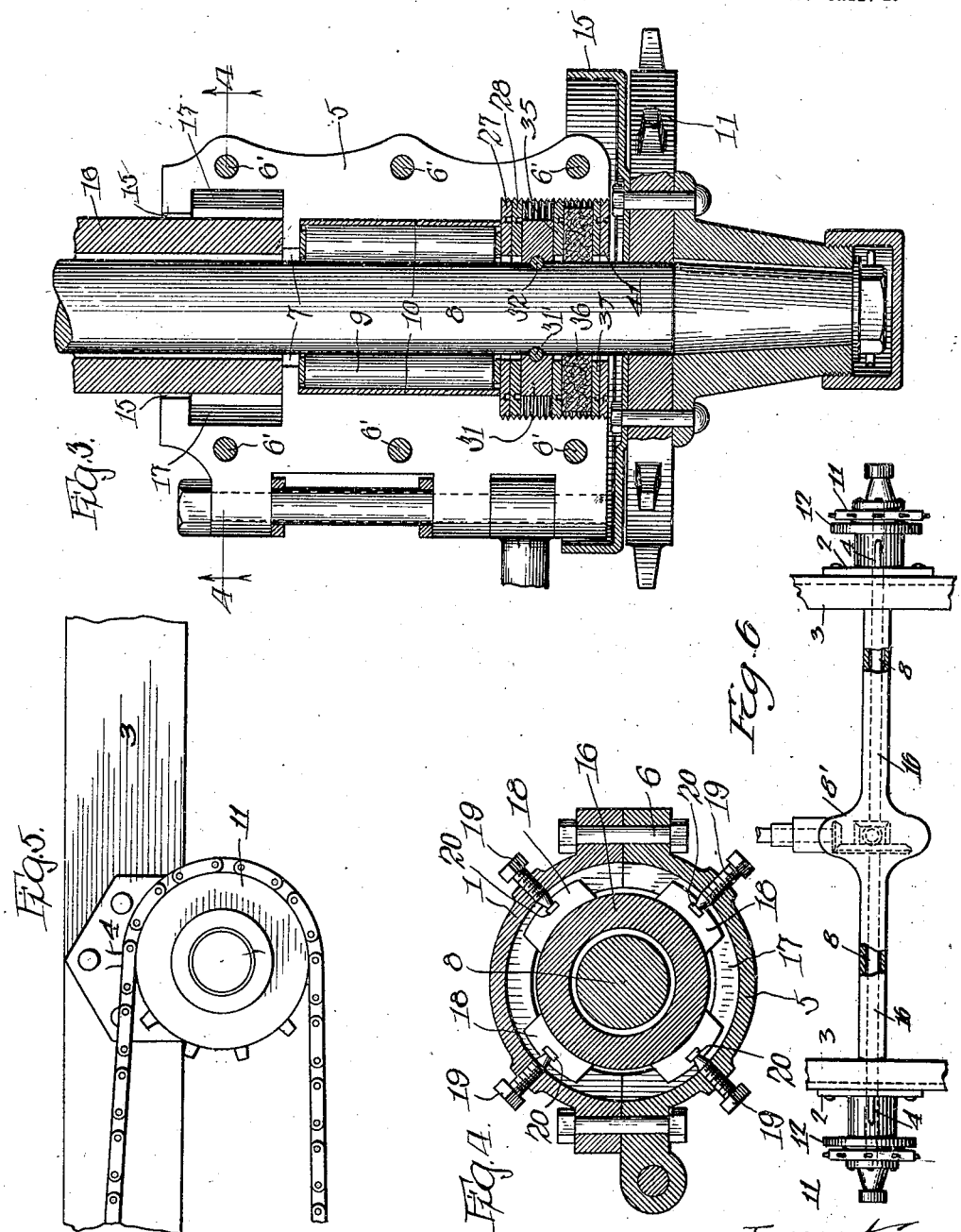

UNITED STATES PATENT OFFICE.

HARRISON R. WILLIAMS, OF CHICAGO, ILLINOIS, ASSIGNOR TO DEARBORN TRUCK COMPANY.

ADJUSTABLE SHAFT-HANGER FOR MOTOR-VEHICLES.

1,342,143.   Specification of Letters Patent.   Patented June 1, 1920.

Application filed March 12, 1917, Serial No. 154,079. Renewed October 22, 1919. Serial No. 332,574.

*To all whom it may concern:*

Be it known that I, HARRISON R. WILLIAMS, a citizen of the United States, residing at the city of Chicago, in the county of Cook and State of Illinois, have invented certain new and useful Improvements in Adjustable Shaft-Hangers for Motor-Vehicles, of which the following is a specification.

My invention relates to that class of devices which are used in the conversion of pleasure cars, or the chassis thereof, into motor trucks. Such conversion has usually been made by supplying a supplemental frame of original size and greater weight to the frame of the original car, adding a fixed or dead axle, and driving the wheels on such axle by power derived from the rear axle of the original car, which, for the purposes of the modified construction, becomes a jack shaft with sprocket wheel attachments. As the rear axles and the axle housings of different manufacture differ from each other in form and dimensions, the convertibility of such cars has been comparatively limited and the use of cars for the purpose of turning them into motor trucks has been correspondingly limited by the necessity heretofore of having a special construction of the jack shaft hangers for each make or pattern of car so converted. It is the object of my invention to provide means by which the devices necessary for transformation of the kind above described may be adjustable so that they can be used in connection with the original rear axle of any make of car which it is desired to convert into a motor truck. My invention comprises, among other things, a jack shaft hanger to which the shaft housing may be adjustably attached with reference thereto and to the shaft, and means for holding the sections of the shaft in operative position in the hangers and for giving longitudinal adjustment thereto. All of which with details of construction will be described in the specification and pointed out in the claims.

The principles of my invention are illustrated in the drawings, in which—

Figure 1 represents a vertical, longitudinal section of my improved hanger;

Fig. 2 is a transverse section thereof on the line 2—2 of Fig. 1;

Fig. 3 is a horizontal section thereof on the line 3—3 of Fig. 1;

Fig. 4 is a transverse section on the line 4—4 of Fig. 3;

Fig. 5 is an elevation of the said hanger shown in its attached position.

Fig. 6 is a top plan view of a part of a supplemental motor truck frame showing my improved hanger and the combination thereof with a two-piece shaft and the shaft housing and differential.

Further describing my invention with reference to the drawings, in which like characters of reference denote like parts throughout: 1 is the upper part of the journal box or casing of my improved hanger. 2 is an integrally formed hanger flange by which the same is attached to the longitudinal chassis bar 3 of a motor truck. 4 is a strengthening rib, and 5 is the lower portion of said journal box or casing which is attached to the upper part 1 thereof by bolts 6 passed through the openings 6'. There is a shaft opening 7 longitudinally of the journal box, through which is passed one of the sections 8 of a two-piece shaft centrally connected to the differential 8'. The said opening is enlarged centrally of the casing to provide a seat for the shaft bearings 9 which are inclosed in a casing 10 in the usual manner. On the end of the shaft is keyed a sprocket wheel 11, to which is bolted the brake drum 12. The inner end of the hanger casing is enlarged at 15 to receive an axle casing or housing 16, and as the size thereof varies with the kind of car upon which the same may be originally used such opening should be of sufficient size to give clearance to the largest size housing which is likely to be used. The axial opening is further enlarged adjacently to the inner end thereof to provide annular grooves 17, in which are mounted the adjusting blocks or dogs 18, to which radial motion to and from the shaft housing 16 is given by means of adjustment screws 19. Such adjustment screws have heads 20 at their ends which engage corresponding undercut grooves in the adjustment blocks 18, and thereby hold them in quadrantal position about the groove in which they are seated.

At the outer end of the hanger the axial opening is enlarged to form a cup 25, having the threaded vertical sides 26. A peripherally threaded washer 27 may be fitted thereto and provides means by which the roller bearings and the casings thereof may be held in proper position. A second washer 28 may also be screwed into the cup to form an adjustable abutment against which may rest the collar 30 on shaft 8. A practical form of such collar is shown in Fig. 2 and consists of the segments 31 and 32, which may be held together by pins or bolts 31' and 32', which at the same time rest in notches 33 in the shaft 8, so that the collar will be rigidly fixed to the shaft to prevent relative longitudinal movement. A washer 35, similar in construction to the ones previously described is placed in the cup 25 and by means thereof and of the washer 28 the longitudinal position of axle 8 may be rigidly fixed. A felt packing ring 36 is also secured in place by washer 37 and all of the washers after being properly adjusted are secured by a key 40 fitted to a suitable keyway in the casing and engaging peripheral notches about the washers. Further security to the mechanism described and a locking device for the key is further provided by means of washer 41.

It will be seen that when the shaft sections 8 are fitted in the bearing 9 slight longitudinal adjustment is provided by the washers 28 and 35 between which are held the collar formed by the segments 31, 32 secured to the shaft section. The axle housing having previously been cut to length by removal of the ends is centered and held rigidly in position by the adjustment screws 19 and the blocks 18.

I claim:

1. A jack shaft hanger comprising a casing, having a shaft opening therethrough, a bearing for a jack shaft in said opening, and means on the casing for securing a jack shaft housing to said casing.

2. A jack shaft hanger comprising a casing having an opening to receive a shaft and the end of a shaft housing, a journal bearing in the casing, and adjustable devices on the casing for securing shaft housings of various designs rigidly thereto.

3. A jack shaft hanger comprising a casing having a shaft opening therethrough, said opening being enlarged at its inner end to receive the end of a shaft housing and clamping blocks therefor, clamping blocks in said enlarged parts, and means for closing said blocks on the shaft housing.

4. The combination with a frame, of a shaft hanger enlarged at its inner end and provided with an annular groove adjacent thereto, and further provided with journal bearings for a shaft, a shaft journaled in the said bearings, a shaft housing having one end in the enlarged inner end of the shaft hanger, adjusting blocks in said annular groove, and means for clamping said adjusting blocks upon the end of the shaft housing.

5. The combination with a frame, of a shaft hanger enlarged at its inner end and provided with an annular groove adjacent thereto, of journal bearings on the hanger, a shaft journaled therein, a shaft housing having one end in the enlarged inner end of the shaft hanger, adjusting blocks in said annular groove, and set screws in the hanger casing for adjustably clamping said adjusting blocks upon the end of the shaft housing.

6. The combination with a frame, of a shaft hanger enlarged at its inner end to receive the end of a shaft housing, journal bearings in the hanger, a shaft journaled therein, a shaft housing having one end in the enlarged inner end of the shaft hanger, adjusting blocks in said hanger, and means for adjustably clamping said bearing blocks upon the end of the shaft housing for axial alinement thereof.

7. A hanger for a jack shaft and the housing thereof comprising a casing having a shaft opening therethrough, and provided with jack shaft bearings, and means on the casing for securing a jack shaft housing thereto.

8. A hanger for a jack shaft and the housing thereof comprising a casing having a shaft opening therethrough, and provided with jack shaft bearings, and means on the casing for adjustably securing a jack shaft housing conformably to the axial alinement of a jack shaft when mounted in the said bearings.

9. A shaft hanger adapted for attachment to a frame for reception of a jack shaft, said hanger enlarged at its inner end and provided with an annular groove adjacent thereto and further provided with journal bearings for said jack shaft, a shaft housing having one end in the enlarged inner end of the shaft hanger, adjusting blocks in said annular groove, and means for clamping said adjusting blocks upon the end of the shaft housing.

10. In a device of the character described, the combination of a jack shaft, a collar secured thereto, a hanger having a jack shaft opening enlarged to provide a bearing seat and further enlarged at the outer end to form an internally threaded cup, bearings in said bearing seat, a peripherally-threaded washer in said cup to secure the bearings in said seat and a second peripherally-threaded washer in said cup between which and the said first named washer the shaft collar is received to secure the shaft against longitudinal movement when mounted in said bearings.

11. The combination with a jack shaft and the housing therefor of a motor vehicle, of a hanger having an opening for the shaft and bearings therefor, means engaging the shaft and hanger to prevent longitudinal movement of the shaft relatively to the hanger and means for securing the jack shaft housing against lateral movement relatively to the jack shaft.

12. The combination with a jack shaft and the housing therefor of a motor vehicle, of a hanger having an opening for the shaft and bearings therefor, means engaging the shaft and hanger to prevent longitudinal movement of the shaft relatively to the hanger and means on the casing for adjustably securing the jack shaft housing in axial alinement with the jack shaft.

13. The combination with the members of a supplemental frame for motor trucks, of a plurality of jack-shaft hangers secured to said members including casings having shaft openings, a two-piece shaft journaled in the hangers, a differential connecting the two sections of the shaft, a housing for the shaft and differential, and adjustable means on the hangers for securing the outer ends of the housing in the inner ends of the shaft openings in proper relation to the shaft sections.

14. The combination with the members of a supplemental frame for motor trucks, of a plurality of jack-shaft hangers secured to said members including casings having shaft openings enlarged at their inner ends, a two-piece shaft journaled in the hangers, a differential connecting the two sections of the shaft, a housing for the shaft and differential, and adjustable means on the hangers for securing the outer ends of the housing in the inner ends of the shaft openings in proper relation to the shaft sections.

15. The combination with the members of a supplemental frame for motor trucks, of a plurality of jack-shaft hangers secured to said members including casings having shaft openings, a two-piece shaft journaled in the hangers, a differential connecting the two sections of the shaft, a housing for the shaft and differential, adjustable means on the hangers for securing the outer ends of the housing in the inner ends of the shaft openings in proper relation to the shaft sections, and means in the hanger casings for holding the shaft sections against longitudinal movement.

16. The combination with the members of a supplemental frame for motor trucks, of a plurality of jack-shaft hangers secured to said members including casings having shaft openings, a two-piece shaft journaled in the hangers, a differential connecting the two sections of the shaft, a housing for the shaft and differential, adjustable means on the hangers for securing the outer ends of the housing in the inner ends of the shaft openings in proper relation to the shaft sections, and means in the hanger casings for adjustably holding the shaft sections against longitudinal movement.

17. In combination, a hanger, a jack shaft housing supported directly thereby, a jack shaft within said housing and a bearing for said jack shaft also supported directly by said hanger whereby said jack shaft and its housing are supported independently of each other.

18. In combination, a hanger, a jack shaft housing supported directly thereby, a jack shaft within said housing and out of contact therewith, a bearing for said jack shaft also supported directly by said hanger whereby said jack shaft and its housing are supported independently of each other, and means for adjusting said housing with respect to said hanger and hence with respect to said jack shaft.

19. In combination, a hanger, a jack shaft housing, the end of which is supported directly thereby, a jack shaft within said housing and projecting from the end thereof, a bearing for the projecting end of said jack shaft, said bearing also being supported directly by said hanger and a driving sprocket mounted on said projecting end.

20. In combination, a jack shaft hanger, a jack shaft housing within the same, a jack shaft within said housing, adjustable means for centering said housing within said hanger and a bearing structure associated with said hanger and supporting said jack shaft independently of its housing.

In witness whereof, I have hereunto subscribed my name this 9th day of March, 1917, at Chicago, Cook County, Illinois.

H. R. WILLIAMS.